United States Patent [19]

Masuoka et al.

[11] Patent Number: 5,186,835

[45] Date of Patent: Feb. 16, 1993

[54] POROUS HYDROPHILIC POLYPROPYLENE MEMBRANE, METHOD FOR PRODUCTION THEREOF, AND BLOOD PLASMA SEPARATION APPARATUS

[75] Inventors: Toshio Masuoka, Tsukuba; Okihiko Hirasa, Tsukuba; Makoto Onishi; Yukio Seita, both of Fuji, all of Japan

[73] Assignees: Agency of Industrial Science and Technology; Terumo Kabushiki Kaisha, both of Tokyo, Japan

[21] Appl. No.: 465,240

[22] PCT Filed: Sep. 12, 1988

[86] PCT No.: PCT/JP88/00920

§ 371 Date: Apr. 26, 1990

§ 102(e) Date: Apr. 26, 1990

[87] PCT Pub. No.: WO89/02303

PCT Pub. Date: Mar. 23, 1989

[30] Foreign Application Priority Data

Sep. 11, 1987 [JP] Japan .................. 62-226298

[51] Int. Cl.$^5$ .............................. B01D 67/00
[52] U.S. Cl. ............. 210/500.36; 210/500.38; 264/49
[58] Field of Search ............. 427/244, 245, 246; 210/500.36, 500.38, 321.84, 347, 232, 351; 264/41, 49

[56] References Cited

U.S. PATENT DOCUMENTS

| | | | |
|---|---|---|---|
| 3,083,118 | 3/1963 | Bridgeford | 427/340 X |
| 4,501,793 | 2/1985 | Sarada | 210/500.36 X |
| 4,597,868 | 7/1986 | Watanabe | 210/347 X |
| 4,845,132 | 7/1989 | Masuoka et al. | 210/490 X |

FOREIGN PATENT DOCUMENTS

| | | |
|---|---|---|
| 0249513 | 12/1987 | European Pat. Off. . |
| 0369014 | 5/1990 | European Pat. Off. . |
| 60-9460 | 3/1985 | Japan . |
| 62-97603 | 5/1987 | Japan . |
| 62-179540 | 8/1987 | Japan . |
| 62-201604 | 9/1987 | Japan . |
| 63-145662 | 6/1988 | Japan . |
| 63-240902 | 10/1988 | Japan . |

*Primary Examiner*—Frank Spear
*Attorney, Agent, or Firm*—Burns, Doane, Swecker & Mathis

[57] ABSTRACT

A porous hydrophilic polypropylene membrane possessing a fine reticular structure, which is characterized by the fact that at least either of the opposite surfaces of membrane forms a surface layer of a reticular structure substantially equal to that in the interior of membrane, the membrane surfaces and the surfaces of pores in the membrane have a hydrophilic polymer chemically bonded thereto, and the membrane is composed substantially of a polypropylene possessing an average pore diameter in the range 0.1 to 2.0 μm, a bubble point of not more than 2.0 kg/cm$^2$, a porosity in the range of 60 to 85%, and a water permeability of not less than 2 ml/min.mmHgm$^2$, a method for the production thereof, and a blood plasma separation apparatus incorporating such membranes in a housing are disclosed.

14 Claims, 4 Drawing Sheets

POROUS HYDROPHILIC POLYPROPYLENE MEMBRANE, METHOD FOR PRODUCTION THEREOF, AND BLOOD PLASMA SEPARATION APPARATUS

DESCRIPTION

1. Technical Field

This invention relates to a porous hydrophilic polypropylene membrane, a method for the production thereof, and a blood plasma separation apparatus. More particularly, it relates to a flat sheetlike porous polypropylene membrane, a method for the production thereof, and a blood plasma separation apparatus. Still more particularly, this invention relates to a flat sheetlike porous hydrophilic polypropylene membrane which excels in compatibility to blood and dimensional stability and which, when used for the separation of blood plasma, permits quick separation of blood plasma and has a remote possibility of suffering from embedment of blood cells or hemolysis, a method for the production thereof, and a blood plasma separation apparatus.

2. Background Art

Heretofore, various permeable membranes have found utility for the separation of blood into the component of blood cells and the component of blood plasma. The permeable membranes are now used for the defecation of blood plasma aimed at removal of abnormal protein, immune complex, antigen, and antibody from patients with diseases due to abnormal immunity such as general erythematodes, chronic arthrorheumatism, glomerular nephtrities, and bulbospinal paralysis, for the preparation of blood plasma agents for componental transfusion, for the pretreatment of artificial kidneys, and so on. For example, cellulose acetate membranes (Japanese Patent Laid-Open SHO 54(1979)-15,476), polyvinyl alcohol membranes, polyester membranes, polycarbonate membranes, polymethyl methacrylate membranes, polyethylene membranes (Japanese Patent Laid-Open SHO 57(1982)-84,702), and polypropylene membranes have been used as permeable membranes for the separation of blood plasma. These permeable membranes are deficient in mechanical strength, porosity, and ability to separate blood plasma. When they are used for the separation of blood plasma, the red blood cells sustain injury due to clogging, the complemental component in the blood plasma is suffered to undergo activation, and the separated blood plasma is seriously injured ("Artificial Internal Organs," Vol. 16 No. 2, pp. 1045–1050) (1987).

A permeable membrane produced by mixing a polymer such as crystalline polyolefin or polyamide which exhibits sparing solubility in solvents and possesses expandability with a compound which possesses partial compatibility with the polymer and exhibits ready solubility in solvents, molding the resultant mixture into a film, a sheet, or a hollow article, treating the molded article with a solvent, drying the wet molded article, and thereafter stretching the dried molded article uniaxially or biaxially by a ratio in the range of 50 to 15,000% has been proposed (Japanese Patent Publication SHO 57(1982)-20,970). Since this membrane is stretched for the purpose of enlarging the pores in diameter, it has a large thermal shrinkage such that, when used as a medical material, it cannot tolerate the impact of sterilization in an autoclave. Further, since this membrane acquires its porous texture in consequence of the stretching, the pores are linear extensions substantially parallel to the direction of all thickness of the membrane and have a substantially uniform cross section in the opposite surface parts and in the interior part thereof. When this membrane is used for the separation of blood plasma, therefore, the pores therein are highly liable to be clogged with proteins and blood cells.

Regarding the applicability of a permeable membrane to the separation of blood plasma, polyolefin type macromolecular compounds have been attracting attention as a material characterized by manifesting only an insignificant complemental activity. Thus, permeable membranes using polyolefin type macromolecular compounds are being studied with respect to their feasibility in the intended application under discussion. For example, a method for producing a porous membrane by melt mixing 10 to 80% by weight of a paraffin with 90 to 20% by weight of a polypropylene resin, extruding the resultant molten mixture through a die into a film, a sheet, or a hollow fiber, leading the molded mixture still in the molten state into a water bath kept at a temperature below 50° C. to be suddenly cooled and solidified, and subsequently extracting the paraffin from the resultant solidified molded article has been disclosed (Japanese Patent Laid-Open SHO 55(1980)-60,537). Since the porous membrane obtained by this method undergoes the step of sudden cooling with cold water of large specific heat, the pores in the surface parts and those in the inner part of the membrane are both small in diameter and the membrane has a low porosity. Thus, this membrane suffers from a low speed of permeation and does not fit quick separation of blood plasma.

As means for cooling and solidifying the aforementioned molten mixture, a method using a metallic roller and a method using a cooling and solidifying liquid such as a paraffin which possesses high compatibility with the aforementioned organic filler (Japanese Patent Application SHO 60(1985)-237,069) have been proposed. The porous membrane obtained by the former method possesses extremely minute surface pore diameters and, therefore, permits the permeation of blood plasma to proceed at a low speed. In the latter method, the cooling and solidifying liquid has a small specific heat as compared with water and, therefore, promotes crystallization of polypropylene at a proper cooling speed. In the inner part of the membrane, therefore, pores are formed in a large diameter enough to permit separation of blood plasma. In the surface parts of the membrane, however, there is formed a very large reticular structure which is thought to have been formed because the polypropylene distributed in the surface parts is caused to dissolve into the cooling and solidifying liquid before it is solidified. The porous membrane possessing such surface layers as described above suffers sparingly from clogging of pores with proteins and permits the separation of blood plasma to proceed at a satisfactorily high speed. It, however, has the possibility that, on contact with the blood, the blood cells will be embedded will therein and the blood cells so embedded undergo hemolysis under the impact of pressure.

Hydrophobic membranes such as of polyolefins have no noticeably high ability to activate the complemental system and nevertheless suffer from the disadvantage that they are deficient in capacity for recovery of such useful molecules as fibrinogen and a blood coagulating factor.

The hybrophobic membranes are further disadvantageous in respect that they must be subjected to an extra treatment for impartation of hydrophilicity prior to use.

A porous membrane which has the membrane surfaces and the surfaces of the pores in the membrane rendered hydrophilic has been disclosed in Japanese Patent Application SHO 61(1986)-103,011. In accordance with the method of production as set forth in the specification (working examples and photographs), the membrane to be produced tends to form in the surfaces thereof pores of a large diameter such as to entail serious embodiment of blood cells and consequent ready hemolysis. For the purpose of enabling the membrane to manifest high compatibility to blood, mere incorporation therein of a graft chain of a hydrophilic monomer is not sufficient. The membrane in its simple form is required to have a water-soluble macromolecular compound chemically bonded thereto.

An object of this invention, therefore, is to provide a novel porous hydrophilic polypropylene membrane and a method for the production thereof.

Another object of this invention is to provide a flat sheetlike porous hydrophilic polypropylene membrane to be used for the isolation of blood plasma by separation of blood into the portion of blood cells and the portion of blood plasma and the removal of microorganisms from blood, for example.

Yet another object of this invention is to provide a flat sheetlike porous hydrophilic polypropylene membrane which excels in compatibility to blood and dimensional stability and which, when used for the isolation of blood plasma from blood, permits quick separation of blood plasma, sparingly inflicts injury to the isolated blood plasma, and has little possibility of entailing embodiment of blood cells and hemolysis and a method for the production thereof.

DISCLOSURE OF INVENTION

The objects described above are accomplished by a porous hydrophilic polypropylene membrane possessing a fine reticular structure, which is characterized by the fact that at least either of the opposite surfaces of membrane forms a surface layer of a reticular structure substantially equal to that in the interior of membrane, the membrane surfaces and the surfaces of pores in the membrane have a hydrophilic polymer chemically bonded thereto, and the membrane is composed substantially of a polypropylene possessing an average pore diameter in the range of 0.1 to 2.0 μm, a bubble point of not more than 2.0 kg/cm$^2$, a porosity in the range of 60 to 85%, and a water permeability of not less than 2 ml/min.mmHg.m$^2$.

This invention further discloses a porous hydrophilic polypropylene membrane whose ratio of shrinkage after a heat treatment at 120° C. for 20 minutes is not more than 5.0%.

This invention further discloses a porous hydrophilic polypropylene membrane whose ratio of swelling on being wetted is within 1.0%. This invention further discloses a porous hydrophilic polypropylene membrane whose hydrophilic polymer is at least one member selected from the group of polymers represented by the following formula I:

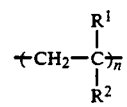

wherein $R^1$ is H or $CH_3$ and $R^2$ is

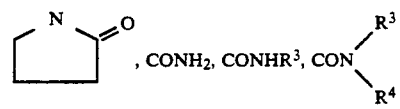

wherein $R^3$ and $R^4$ are each an alkyl of 1 to 4 carbon atoms,

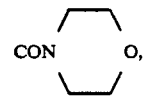

COOM, wherein M is a metallic element, COOR$^5$NHR$^6$, wherein $R^5$ is an alkylene of 1 to 4 carbon atoms and $R^6$ is an alkyl of 1 to 4 carbon atoms,

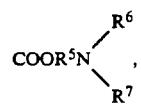

wherein $R^5$ and $R^6$ are as defined above and $R^7$ is an alkyl of 1 to 4 carbon atoms, or

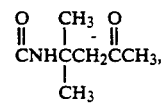

providing that $R^1$ is H where $R^2$ is

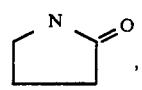

and n is an integer in the range of 10 to 10$^4$. Further this invention discloses a porous hydrophilic polypropylene membrane whose hydrophilic polymer is represented by following formula II:

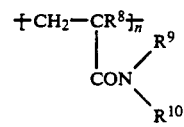

wherein n is as defined above, $R^8$ is H or $CH_3$ and $R^9$ and $R^{10}$ each are an alkyl group, providing that the total number of carbon atoms of $R^8$, $R^9$, and $R^{10}$ is not more than 8.

The objects described above are further accomplished by a method for the production of porous hydrophilic polypropylene membrane, which comprises mixing 100 parts by weight of a polypropylene with 200 to 600 parts by weight of an organic filler uniformly dispersible in the polypropylene in a molten state and 0.1 to 5.0 parts by weight of a crystal seed-forming agent, discharging the resultant molten mixture into a flat sheet to form a molten membrane, cooling and solidifying the molten membrane with a liquid polyether, then extracting the organic filler from the solidified molten membrane, thermally setting the molten membrane, irradiating the resultant hydrophobic polypropylene membrane with a low-temperature plasma thereby forming a polymerization-initiating point on polypropylene molecules, reducing the pressure of the enveloping atmosphere of the reaction system to below 0.01 torr, and subsequently supplying a hydrophilic monomer to the reaction system thereby effecting chemical linkage of a hydrophilic polymer to the surfaces of the membrane and the surfaces of the pores in the membrane.

This invention further discloses a method for the production of a porous hydrophilic polypropylene membrane, wherein the contact of the molten membrane with the cooling and solidifying liquid is accomplished by disposing a guide roller in the cooling and solidifying liquid bath in such a manner that part of the guide roller remains above the surface of the cooling and solidifying liquid, and causing the molten membrane to be discharged onto the guide roller and then guided into the cooling and solidifying liquid by virtue of the rotation of the guide roller.

This invention further discloses a method wherein the polypropylene possesses a melt index in the range of 5 to 70. Further, this invention discloses a method wherein the polypropylene is a mixture of 100 parts by weight of a polypropylene possessing a melt index in the range of 5 to 40 with 0 to 150 parts by weight of a polypropylene possessing a melt index in the range of 0.05 to 5. This invention further discloses a method wherein the blood plasma seed-forming agent is incorporated in an amount in the range of 0.1 to 1.0 part by weight. This invention further discloses a method wherein the crystal seed-forming agent is an organic heat-resistant substance possessing a melting point of not lower than 150° C. and a gelling point not lower than the crystallization starting point of the polypropylene. Further, this invention discloses a method wherein the hydrophilic polymer is at least one member selected from the group of compounds represented by the following formula III:

$$\begin{array}{c} R^1 \\ | \\ CH_2=C \\ | \\ R^2 \end{array} \quad (III)$$

wherein $R^1$ is H or $CH_3$ and $R^2$ is

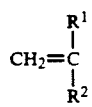, $CONH_2$, $CONHR^3$, $CON\begin{array}{c}R^3\\ \diagdown\\ \diagup\\ R^4\end{array}$ wherein $R^3$ and $R^4$ each are an alkyl of 1 to 4 carbon atoms,

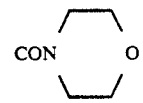

COOM, wherein M is a metallic element, $COOR^5NHR^6$, wherein $R^5$ is an alkylene of 1 to 4 carbon atoms and $R^6$ is an alkyl of 1 to 4 carbon atoms,

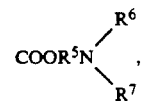

wherein $R^5$ and $R^6$ are as defined above and $R^7$ is an alkyl of 1 to 4 carbon atoms, or

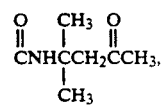

providing that $R^1$ is H where $R^2$ is

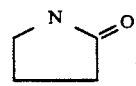

and n is an integer in the range of 10 to $10^4$. Further this invention discloses a method wherein the hydrophilic monomer is represented by the following formula (IV):

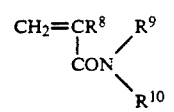 (IV)

wherein $R^8$ is H or $CH_3$ and $R^9$ and $R^{10}$ each are an alkyl group, providing that the total number of carbon atoms of $R^8$, $R^9$, and $R^{10}$ is not more than 8.

The objects described above are accomplished by a blood plasma separation apparatus comprising a plurality of separation membrane units each formed by vertically opposing face to face two porous hydrophilic polypropylene membranes each possessing a fine reticular structure and at least either of the opposite surfaces of membrane forming a surface layer of a reticular structure substantially equal to that in the interior of membrane, the membrane surfaces and the surfaces of pores in the membrane having a hydrophilic polymer chemically bonded thereto, and the membrane being composed substantially of a polypropylene possessing an average pore diameter in the range of 0.1 to 2.0 μm, a bubble point of not more than 2.0 kg/cm², a porosity in the range of 60 to 85%, and a water permeability of not less than 2 ml/min. mmHg.m² thereby interposing a blood plasma flow path between the two opposed membranes, sealing the peripheral part of the flow path, and providing at least one of the separation membranes with a blood plasma outlet, a case accommodating the plurality of separation membrane units in a superposed state and provided with a blood inlet, a blood outlet, and a blood plasma outlet, and means for establishing communication between the blood plasma outlet of each of the separation membrane units and the blood plasma outlet of the case.

This invention further discloses a blood plasma separation apparatus wherein the porous hydrophilic polypropylene membrane exhibits a ratio of shrinkage of not more than 5.0% after a heat treatment at 120° C. for 20 minutes. This invention further discloses a blood plasma separation apparatus wherein the porous hydrophilic polypropylene membrane exhibits a ratio of swelling within 1.0% on being wetted.

BEST MODE FOR CARRYING OUT THE INVENTION

Figure 1:
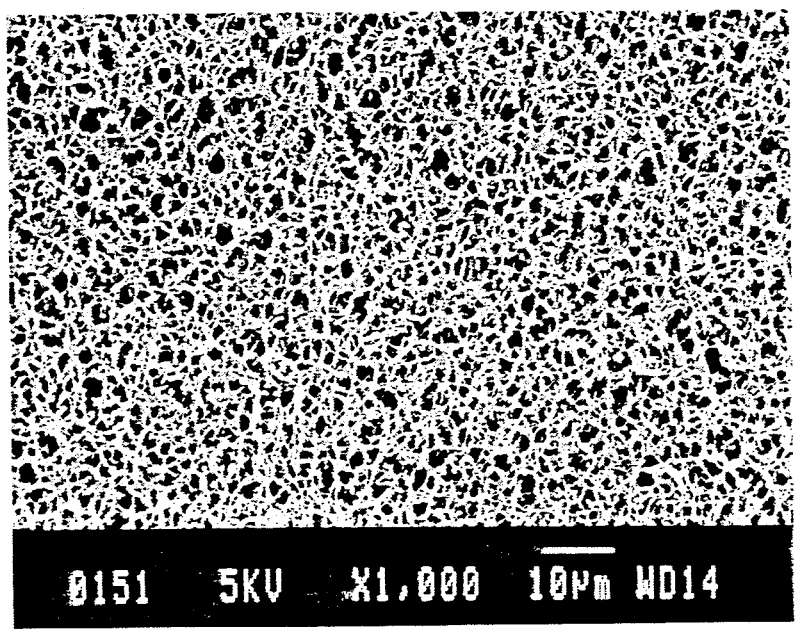
FIG. 1 is an electron micrograph illustrating the surface structure of a porous hydrophilic polypropylene membrane according to the present invention obtained in Example 1.

The porous hydrophilic polypropylene membrane of this invention is a membrane having a wall thickness in the range of 30 to 300 μm, preferably 60 to 200 μm, and having a hydrophilic polymer chemically bonded to the surfaces of membrane and the surfaces of porous in the membrane. The structure of the porous hydrophilic polypropylene membrane is variable with the conditions of the formation of the membrane. When a polyethylene glycol (molecular weight: 200) is used as a cooling and solidifying liquid as described, the produced membrane possesses such a structure as shown in the scanning electron micrographs of FIG. 1 and FIG. 2. To be specific, a fine reticular structure composed of intertwined threads each formed of a chain of polypropylene particles is developed three-dimensionally. Since the surface parts of membrane possess a reticular structure substantially similar to that in the inner part of membrane, the membrane used for separation of blood plasma has a very remote possibility of entailing embedment of blood cells or hemolysis. Since this membrane has the reticular structure developed isotropically unlike the porous membrane produced by the stretching method, it sustains the minimal thermal shrinkage during the treatment in an autoclave. Thus, it tolerates various methods of sterilization.

In order for the porous hydrophilic polypropylene membrane of this invention to manifest amply the ability to separate blood plasma, it is desired to possess an average pore diameter in the range of 0.1 to 2.0 μm, preferably 0.2 to 1.0 μm, a bubble point of not more than 2.0 kg/cm², preferably in the range of 0.2 to 1.6 kg/cm², a porosity in the range of 60 to 85%, preferably 65 to 80%, and a water permeability exceeding 2 ml/min.mmHg.m², preferably falling in the range of 4 to 400 ml/min.mmHg.m². If the average pore diameter is less than 0.1 μm, decreasing in permeability of high molecular weight proteins etc. (e.g. blood coagulating factor VIII or various immune complexes) in blood plasma makes separation and fraction difficult. Conversely, if this average pore diameter exceeds 2.0 μm, the membrane during the course of separation of blood plasma suffers blood cells to be embedded therein or to be decayed readily by hemolysis and the polypropylene membrane is degraded in physical properties and is embrittled possibly to the extent of insufficiently fulfilling the function in the intended use. If the bubble point exceeds 2.0 kg/cm², the membrane has no sufficient capacity for separation of blood plasma. If the porosity is less than 60%, the membrane possesses an insufficient capacity for separation of blood plasma. Conversely, if the porosity exceeds 85%, the polypropylene membrane is degraded in physical properties and is embrittled possibly so much as to manifest a poor performance in the intended use. If the water permeability is less than 2 ml/min.mmHg.m², the membrane is deficient in the ability to effect separation of blood plasma.

The terms and the method of determination used in the present intention are as follows.

The "average pore diameter" refers to the magnitude maximum value of d V/d log r (wherein V is a pore volume and r is a pore radius) which was determined with a mercury porosimeter. The bubble point refers to the magnitude which was determined by the modified method of ASTM F 316, using a stainless steel holder 47 mm in diameter and a liquid phase of isopropyl alcohol, increasing the pressure exerted upon the sample membrane, and finding the particular magnitude of pressure at which a series of bubbles of nitrogen began to rise incessantly up the isopropyl alcohol from the central part of the filter.

The wall thickness of membrane refers to the magnitude which was determined with a micrometer.

The water permeability refers to the magnitude which was actually determined with distilled water at 25° C. under the pressure of 0.7 kgf/cm².

The porosity (P) refers to the magnitude which was determined by immersing a sample porous membrane in ethanol, displacing the ethanol in the membrane with water thereby hydrating the membrane, taking the weight (Ww) of the hydrated membrane, and calculating the following formula, where Wd is the weight of the membrane in a dry state and a (g/cm³) is the density of polymer.

$$P = \frac{(W_w - W_d)}{(W_d/a) + (W_w - W_d)} \times 100$$

The swelling ratio refers to the magnitude which was actually determined by immersing a sample membrane in distilled water at 25° C. for five minutes and measuring changes in size of the membrane before and after the immersion.

The hydrophilic polymer to be chemically bonded to the hydrophobic polypropylene through graft polymerization has no restriction except for the sole requirement that it should be hydrophilic. It is, however, desired not to contain any —OH group because the activation of the complemental system can be curbed more in the absence of this group than in the presence thereof. The monomer unit which is capable of forming the hydrophilic polymer is at least one compound represented by the following formula I':

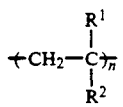 (I')

wherein R$^1$ is H or CH$_3$ and R$^2$ is

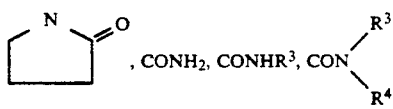, CONH$_2$, CONHR$^3$, CON<R$^3$/R$^4$ wherein R$^3$ and R$^4$ each stand for an alkyl of 1 to 4 carbon atoms,

COOM, wherein M is a metallic atom, COOR$^5$NHR$^6$, wherein R$^5$ is an alkylene of 1 to 4 carbon atoms and R$^6$ is an alkyl of 1 to 4 carbon atoms,

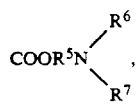

wherein R$^5$ and R$^6$ are as defined above and R$^7$ is an alkyl of 1 to 4 carbon atoms, or

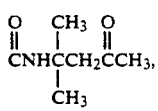

providing that R$^1$ is H where R$^2$ is

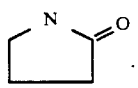

As typical examples of the hydrophilic polymer, there may be mentioned poly-N-vinyl pyrrolidone, poly(meth)acrylamides, poly-N-lower alkyl (meth)acrylamides, poly(meth)acryloyl morpholines, and diacetone (meth)acrylamides. Optionally, the hydrophilic polymer may be a copolymer of such monomer units as mentioned above. The degree of polymerization of the hydrophilic polymer is in the range of 10 to 10$^4$, preferably 10$^2$ to 10$^3$.

The hydrophilic polymer is desired to be in alkyl (meth)acrylamide represented by the following formula II:

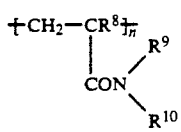 (II)

wherein n is as defined above, R$^8$ is K or CH$_3$ and R$^9$ and R$^{10}$ each are an alkyl group, providing that the total number of carbon atoms, of R$^8$, R$^9$ and R$^{10}$ is not more than 8.

The hydrophilic polymer which is formed of an alkyl acrylamide of the formula II possesses a strongly hydrophobic part in the molecular unit thereof in site of its very large affinity for water. It, therefor, exhibits highly satisfactory affinity for polypropylene and allows the binding reaction within the pores to proceed smoothly and remains in a stable state on the surfaces of membrane. Further, since this membrane does not contain in the molecular unit thereof what activate the complemental system (such as, for example, a hydroxyl group), it possesses high compatibility to blood.

The hydrophilic monomer to be bonded by a reaction to the porous hydrophobic polypropylene membrane is desired to be a monomer represented by the following formula III:

 (III)

wherein R$^1$ and R$^2$ are as defined above, preferably an alkyl (meth)acrylamide represented by the following formula IV:

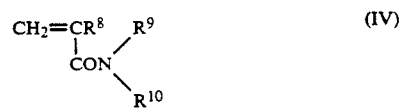 (IV)

wherein R$^8$, R$^9$ and R$^{10}$ are as defined above.

The water-soluble polymer bonded to the surfaces of membrane and to the surfaces of pores in the membrane fulfils the role of curbing the adsorption of such blood plasma proteins as fibrinogen and blood coagulating factor to the membrane, alleviating the clogging of membrane, and enhancing the compatibility of membrane to blood.

Figure 3:
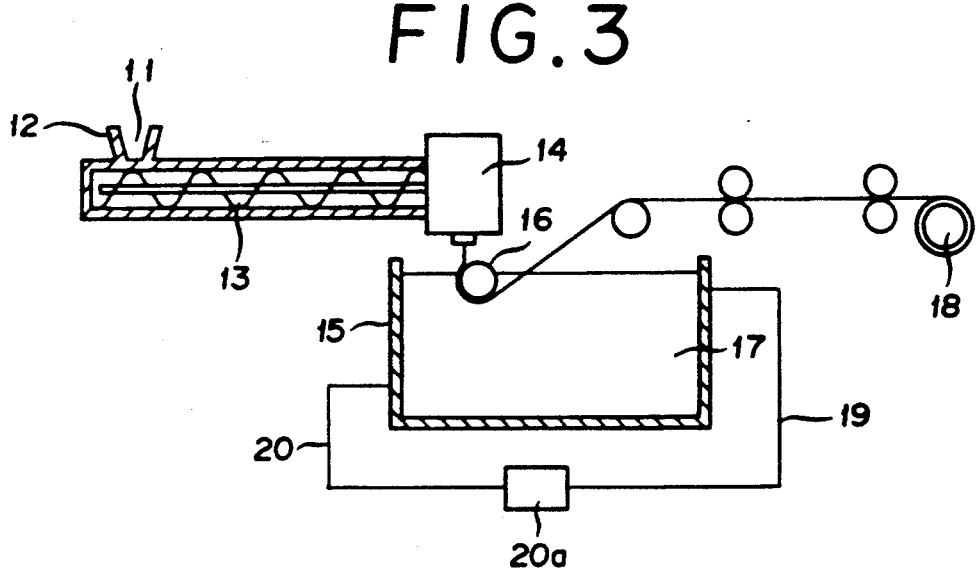
FIG. 3 is an apparatus of production illustrating a method of production of this invention.

The porous hydrophilic polypropylene membrane having these characteristic properties is produced as follows. First, the porous hydrophobic polypropylene membrane is obtained, as described in the specification of U.S. Pat. No. 4,743,375, for example, by supplying a blend 11 comprising polypropylene, an organic filler uniformly dispersible in the polypropylene in a molten state and readily soluble in an extractant to be used, and optionally a crystal seed-forming agent, as illustrated in FIG. 3, through a hopper 12 to kneader such as, for example, a twin-screw type extruder 13, thereby producing a molten mixture, discharging the molten mixture through a die 14, bringing the discharged mixture into contact with a guide roller 16 disposed inside a cooling tank 15 filled with a cooling and solidifying liquid 17 above the surface of the cooling and solidifying liquid 17, allowing the mixture to be led into the cooling and solidifying liquid 17 by virtue of the rotation of the guide roller 16, and removing the organic filler from the resultant membrane by contact thereof with an extractant incapable of dissolving the hydrophobic polymer. Otherwise, the membrane may be produced by subjecting the melted mixture to the casting method by the use of suitable coagulating solvent.

In the procedure described above, the contact between the molten membrane and the cooling and solidifying liquid is depicted as attained by virtue of a guide. This contact may be otherwise attained by directly discharging the molten membrane into the cooling and solidifying liquid. The molten membrane is completely cooled and solidified while it is being passed through the cooling tank 15. Then, the solidified membrane is taken up on a winding roller 18. In the meantime, the cooling and solidifying liquid which is supplied through a line 19 is then discharged in a line 20, cooled to a prescribed temperature by a cooling device (such as, for example, a heat exchanger) 20a, and recycled. The membrane taken up in a roll is then led into an extraction tank (not shown) filled with an extractant to effect extraction of the organic filler from the membrane. The membrane departing from the extraction tank may be optionally subjected to the steps of re-extraction, drying heat treatment, etc. For the sake of stabilization of the structure and permeation property of the porous membrane to be produced, the heat treatment is desired to be performed on the membrane while the membrane is kept immobilized in a fixed length. The extraction of the organic filler may be effected with the extraction tank which is disposed at a stage preceding that of winding.

By placing the porous hydrophobic polypropylene membrane thus produced in a reactor, irradiating it with a low-temperature plasma so as to form polymerization-initiating points on the molecules of polypropylene, reducing the pressure of the enveloping atmosphere to a level below 0.01 torr, and supplying a hydrophilic monomer to the reaction system, water-soluble polymer chains are allowed to grow as bonded to the surface of membrane and the surfaces of pores in the membrane. Then, water-soluble linear polymer chains are quickly synthesized on the surfaces of membrane and on those of pores in the membrane as well by irradiating the membrane with a low-temperature plasma and thoroughly removing the product of decomposition with the plasma and the gas.

The polypropylene to be used as the raw material in the production by the method of this invention is not limited to propylene homopolymer. A block polymer of polypropylene as a main component with other monomer (such as, for example, polyethylene) may be used. The polypropylene to be used is desired to possess a melt index (M.I.) in the range of 5 to 70, preferably 5 to 40. For the purpose of increasing the strength of membrane, the raw material is desired to incorporate therein a polypropylene of a large molecular weight, i.e. a low level of M.I. For example, a raw material obtained by kneading 100 parts by weight of polypropylene possessing an M.I. range of 1.5 to 40 with 20 to 100 parts by weight of polypropylene possessing an M.I. range of 0.05 to 5 is used advantageously. In all the species of polypropylene usable as the raw material, propylene homopolymer particularly of the grade possessing high crystallinity is used most desirably. The organic filler is required to be uniformly dispersible in the aforementioned polypropylene in the molten state and to be readily soluble in the extractant as described hereinafter. As examples of the organic filler, various hydrocarbons such as liquid paraffins (number average molecular weight 100 to 2,000), α-olefin oligomers [represented by ethylene oligomers (number average molecular weight 100 to 2,000), propylene oligomers (number average molecular weight 100 to 2,000)], and ethylene-propylene oligomers (number average molecular weight 100 to 2,000)], and paraffin waxes (number average molecular weight 100 to 2,500)], can be mentioned. Among other organic fillers enumerated above, liquid paraffins prove to be particularly desirable.

The mixing ratio of the organic filler to the propylene is 200 to 600 parts by weight, preferably 300 to 500 parts by weight, of the organic filler to 100 parts by weight of the polypropylene. If the amount of the organic filler is less than 200 parts by weight, the produced porous polypropylene membrane is deficient in porosity and water permeability and offers no sufficient permeation. If this amount exceeds 600 parts by weight, the mixture is excessively deficient in viscosity and the membrane suffers from poor moldability. The blend of raw materials is prepared by melting and mixing the component raw materials in a prescribed composition with an extruder such as, for example, a twin-screw type extruder, extruding the resultant molten mixture, and then pelletizing the extruded mixture.

The crystal seed-forming agent to be incorporated in the raw materials for use in the present invention is an organic heat-resistant substance possessing a melting point exceeding 150° C., preferably falling in the range of 200° to 250° C., and a gelling point exceeding the crystallization-initiating temperature of the polypropylene to be used.

The incorporation of the crystal seed-forming agent is aimed at permitting ample reduction in particle diameter of the polypropylene and necessary control of the gaps in the solid phase, namely the diameter of the pores formed in the membrane. As examples of the crystal seed-forming agent, 1.3, 2.4-di(alkylbenzylidene) sorbitols such as 1.3, 2.4-di-benzylidene sorbitol, 1.3 2.4-di-p-methylbenzylidene sorbitol and 1.3, 2.4-di-p-ethylbenzylidene sorbitol bis(4-t-butylphenyl)sodium phosphate, and sodium benzoate may be mentioned. Among other crystal seed-forming agents enumerated above, 1.3, 2.4-di-benzylidene sorbitol, 1.3, 1.4-di-p-methylbenzylidene sorbitol and 1.3, 2.4-di-p-ethylbenzylidene sorbitol prove to be particularly desirable in respect that they dissolve sparingly into blood.

The mixing ratio of the crystal seed-forming agent to the polypropylene is 0.1 to 5 parts by weight, preferably 0.2 to 1.0 part of weight, of the crystal seed-forming agent to 100 parts by weight of the polypropylene.

The porous hydrophilic polypropylene membrane obtained as described above, on 20 minutes' heat treatment at 120° C., exhibits a ratio of shrinkage not exceeding 5.0%, preferably not exceeding 0.5%. On being wetted it exhibits a swelling ratio not exceeding 1.0%, preferably not exceeding 0.5%. The wall thickness of this hydrophilic membrane requires to be such extent as not to clog the minute pores from viewpoint of ability to separate the blood plasma. It is, for example, not exceeding 200 nm, preferably not exceeding 100 nm.

The porous hydrophilic polypropylene membrane is obtained as described above. The uses to be found for this membrane include a blood plasma separation membrane for the separation of blood into a component of blood cells and blood plasma and a microfilter for the removal of microorganisms from blood, for example. It is used particularly advantageously as a blood plasma separation membrane in applications such as donor plasmapheresis which effective use of blood plasma to be separated or for therapy of immunodisease.

The membrane which is obtained as described above is employed for a varying use, depending on the particular attributes of the membrane body 1 in terms of permeation. It manifests an outstanding performance particularly when it is incorporated as a blood plasma separation membrane in a module as shown below.

Figure 4:
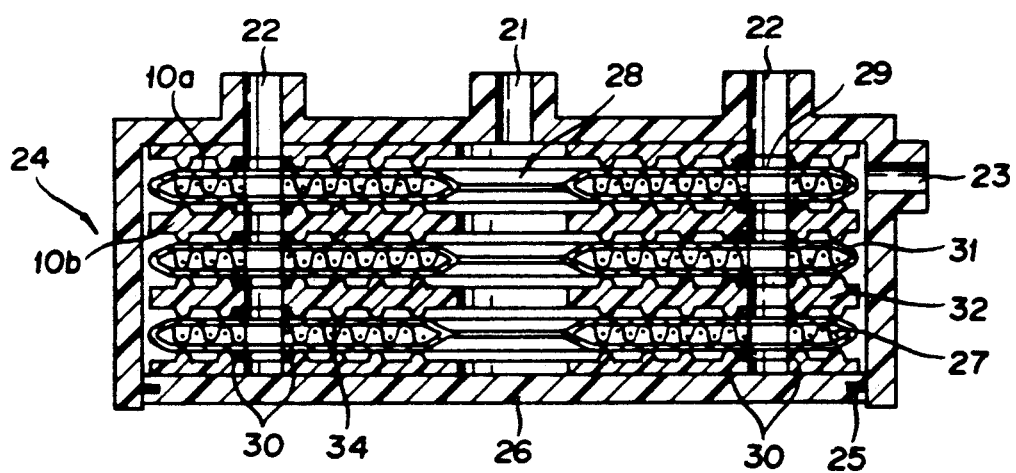
FIG. 4 is a cross section illustrating a blood plasma separation apparatus according to the present invention.

FIG. 4 illustrates in cross section a typical blood plasma separation apparatus as one embodiment of this invention. In this embodiment, within a case which comprises a cylindrical case body 24 provided in the central part of the upper plate thereof with a blood inlet 21, in the peripheral part of an upper plate thereof with blood plasma outlets 22, and on the lateral wall thereof with a blood outlet 23 and a bottom lid member 26 fitted on the circumferentially edge thereof with an O ring, a plurality of membrane units 31 each comprising a circular blood plasma flow path-forming member 27 made of screen mesh or non-woven fabric, provided at the center thereof with an opening part 28 and in the peripheral part thereof with blood plasma passage holes 29, and adapted to have the outer edge thereof nipped between blood plasma separation membranes 10a, 10b, and two seals one for the outer edge thereof and the other for the central opening part are superposed in such a manner as to sandwich flow path regulating members 32 adapted to apply a sealing material 30 around the periphery of the blood plasma passage holes 29 and provided with a plurality of minutes protuberances 34. The membrane units 31 and the flow path regulating members 32 are integrally joined through the medium of the sealing members 30.

In the flow path regulating members 32, the minute protuberances 34 are desired to possess a height in the range of 20 to 200 microns and diameter at the base in the range of 100 to 1,000 microns, the apexes of these minute protuberances are to be separated by a fixed interval in the range of 300 to 2,000 microns, and the minute protuberances are to occupy a total area in the range of 3 to 20% of the entire surface area of the membrane. Preferably, the minute protuberances possess a height in the range of 50 to 100 microns and a diameter at the base in the range of 200 to 500 microns, the apexes of the minute protuberances are separated by a fixed interval in the range of 500 to 1,000 microns, and the minute protuberances occupy a total area in the range of 5 to 15% of the total surface area of the membrane.

To be specific, the height of the individual minute protuberances on the surface of the permeation membrane constitute an important factor for regulating the thickness of the flow path for the body fluid. From the engineering point of view, if the height of these minute protuberances is less than 20 microns, the flow path for body fluid has a thickness so small as to induce heavy pressure loss. If the height exceeds 200 microns, the shear speed cannot be increased enough to obtain ample permeation of the body fluid.

All these matters considered, the height of these minute protuberances is desired to fall in the range of 20 to 200 microns. Though this height is desired to be uniform, the uniformity is not necessarily critical. Optionally, this height may be gradually changed in the direction of the flow of the body fluid.

Now, this invention will be described more specifically below with reference to working examples.

EXAMPLE 1 AND CONTROL 1

With a twin-screw type extruder (produced by Ikegal Iron Works, Ltd. and marketed under product code of "PCM-30-25"), 100 parts by weight of a mixture of two species of polypropylene having melt indexes of 30 and 0.3 (mixing ratio 100:30 by weight), 400 parts by weight of liquid paraffin (number average molecular weight 324), and 0.3 part by weight of 1,3,2,4-bis(p-ethylbenzylidene)sorbitol as a crystal seed-forming agent were melted, kneaded, and pelletized. In the same extruder, the pellets were melted at a temperature in the range of 150° to 200° C., extruded, through a T die 0.6 mm in slit width into the ambient air, allowed to fall onto a guide roller of a cooling liquid tank installed directly below the T die, allowed to be led into the cooling and solidifying liquid in the tank by virtue of rotation of the roller to be cooled and solidified therein, and then taken up in a roll. The cooling and solidifying liquid and the temperature thereof were varied as indicated in Table 1. The rolled film was cut into fixed lengths (about 200×200 mm). A cut piece of film, fixed in both the longitudinal and lateral directions, was immersed a total of four times each for 10 minutes in 1,1,2-trichloro-1,2,2-trifluoroethane (kept at 25° C.) to extract the liquid paraffin and then subjected to two minutes' heat treatment in the air at 135° C.

The porous hydrophobic polypropylene membrane thus obtained was irradiated with a low-temperature plasma (argon 0.1 torr) for 10 seconds and, with the pressure of the enveloping air lowered to 0.001 torr, N,N-dimethyl acrylamide was supplied and caused to react upon the membrane at 25° C. for five minutes. The membrane undergone this treatment was washed with methanol for two days and then dried, to obtain a porous hydrophilic polypropylene membrane having poly(N,N-dimethyl acrylamide), a hydrophilic polymer, bonded to the surfaces thereof and the surface of pores formed therein.

Figure 2:
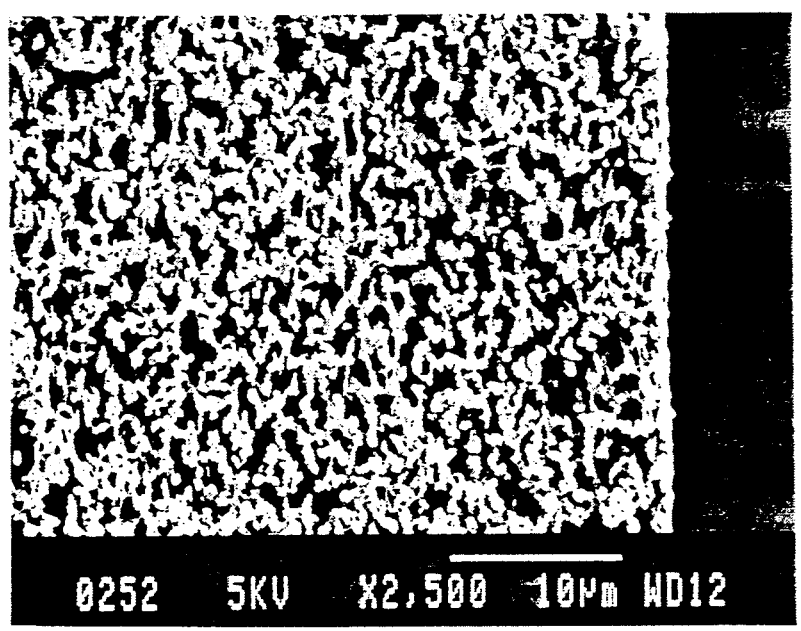
FIG. 2 is an electron micrograph illustrating the cross section of the same porous membrane.

FIG. 1 and FIG. 2 are electron micrographs illustrating structures of the porous hydrophilic polypropylene membrane obtained in Example 1; FIG. 1 depicting a surface of the membrane and FIG. 2 a cross section thereof.

Figure 5:
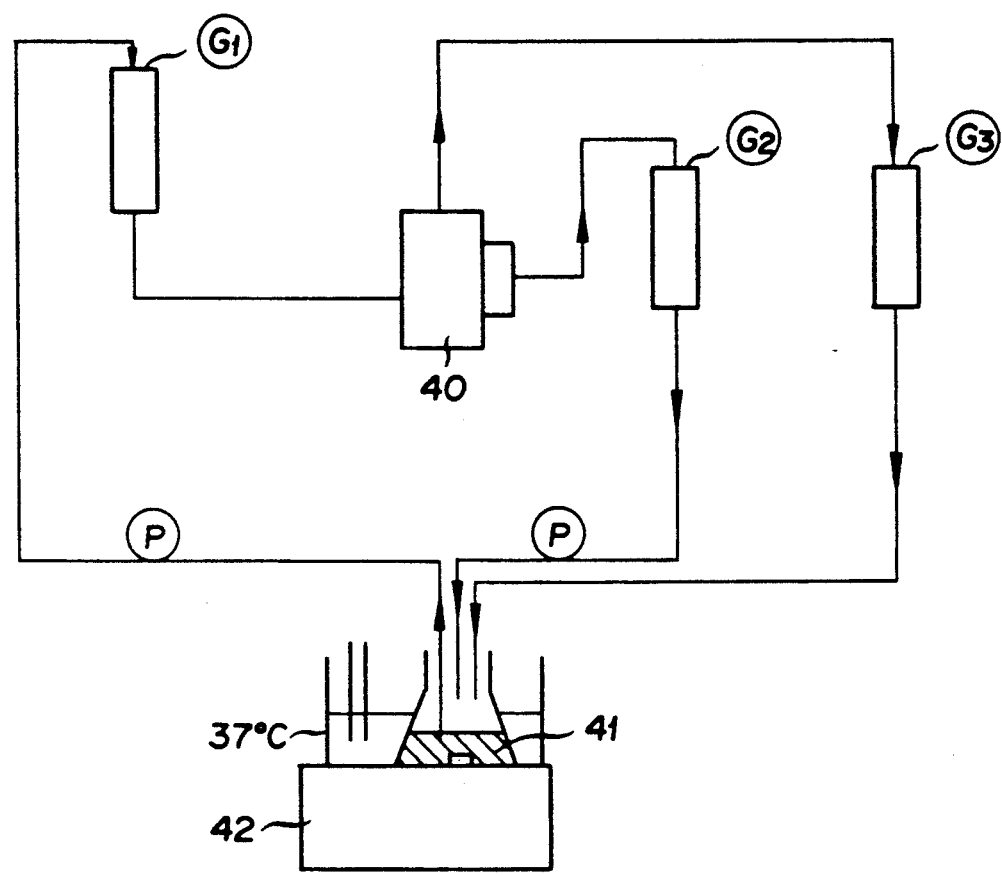
FIG. 5 is a schematic view of circuit of a test on blood plasma separation.
Figure 6:
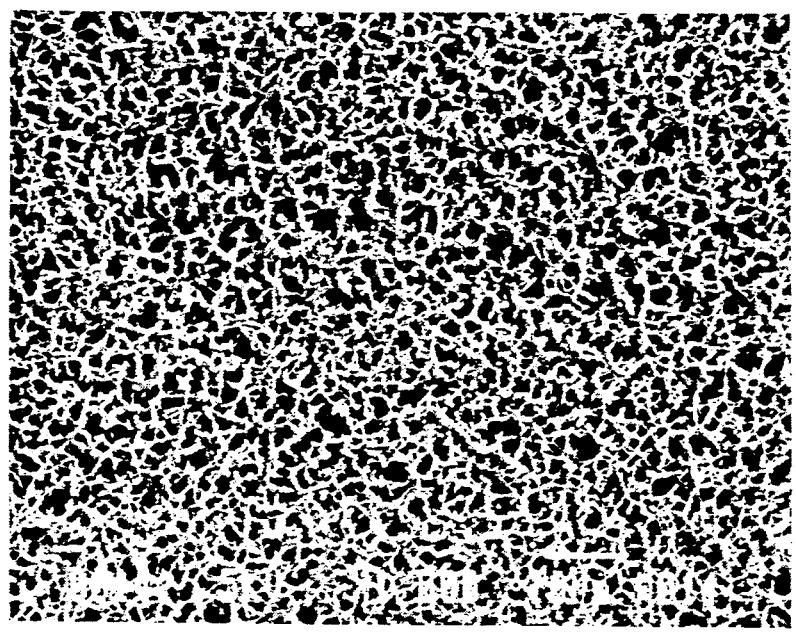
FIG. 6 is an electron micrograph illustrating the surface of the porous hydrophilic membrane of Example 1 after use of the membrane in the separation of bovine blood plasma.
Figure 7:
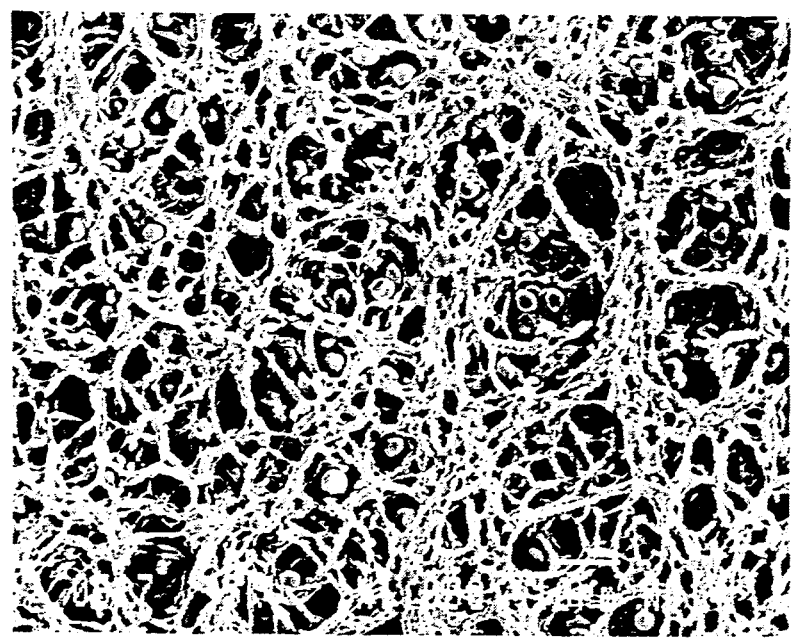
FIG. 7 is an electron micrograph illustrating the surface of the porous hydrophilic membrane of Control 1 after use of the membrane in the separation of bovine blood plasma.

The porous hydrophilic membranes of Example 1 and Control 1 were each incorporated in a blood separation module 40 and stowed in a flask 41 provided with a stirrer 42 and used for the separation of blood plasma from bovine blood. FIG. 6 and FIG. 7 are electron micrographs illustrating the surfaces of the membranes resulting from the blood plasma separation. In the diagram of FIG. 5, P stands for a pump and G1 to G3 stand each for a pressure gauge. In the membrane of Example 1, virtually no sign of embedment of blood cells in the membrane surface was observed unlike the membrane of Control 1. The results of the test are shown in Table 1.

EXAMPLE 2 AND CONTROLS 2 AND 3

A hydrophobic polypropylene membrane possessing the same membrane structure as that of Example 1 and having no water-soluble polymer bonded to the surfaces of membrane or to the surfaces of pores in the membrane was used in Control 2 and a cellulose acetate membrane (produced by Toyo Roshi Company), a porous hydrophilic membrane possessing a pore diameter roughly equal to that of the membrane of Example 2 was used in Control 3.

These porous blood plasma separation membranes were subjected to an in vitro test for blood plasma separation using human blood. As an index of the recovery of a coagulating factor in the filtered blood plasma, the ratios of recovery of fibrinogens F, VIII: C were determined. As an index of the activation of the complemental system, the $C_{3a}$ a concentration in the filtered blood plasma was determined.

a disk-shaped module of membrane 130 cm² in surface area was tested with a circuit illustrated in FIG. 3 under the conditions of 25 mmHg of filtration pressure and 37° C. of temperature. The data obtained in the initial stage of filtration (10 minutes following the start of separation), in which the structures of the surfaces of membrane and the surfaces of pores in the membrane had conspicuous influences upon the adsorption of blood plasma proteins and the activation are shown in Table 2. The porous hydrophilic polypropylene membrane of the present invention recovered the fibrinogens F. VIII:C in high ratios and caused activation of the complemental system only sparingly, indicating excellence in the blood binding property.

The results are shown in Table 2.

blood plasma for componental transfusion. Owing to its excellent compatibility to blood, the porous hydrophilic polypropylene membrane not only serves advantageously as a membrane for the treatment of blood and as a porous carrier but also manifests a notable effect as an ultrafiltration separation membrane for attaining removal of microbes without entailing the problem of clogging in the field of pharmaceutical industry and foodstuff industry.

Since the porous hydrophilic polypropylene membrane of this invention is capable of retaining an excellent dimensional stability even during the course of heat treatment or swelling treatment, it can be used in the activities of pharmaceutical industry and foodstuff industry which require sterilizing operations. Further, it can preclude the channeling phenomenon due to the deformation by swelling which often poses a problem

TABLE 1

| | Cooling and solidifying liquid | Cooling temperature (°C.) | Porosity (%) | Wall thickness (μm) | Water permeability (ml/min. − mmHg.m²) | Average Pore diameter(μm) | Bubble point (kg/cm²) | Thermal shrinkage (%) | Swelling ratio (%) | Embedment of blood cells |
|---|---|---|---|---|---|---|---|---|---|---|
| Example 1 | Polyethylene glycol | 35 | 65 | 146 | 39 | 0.42 | 1.1 | 1.4 | 0.3 | None (FIG. 6) |
| Control 1 | Liquid paraffin | 38 | 65 | 120 | 48 | 0.39 | 1.1 | 1.3 | 0.3 | Observed (FIG. 7) |

TABLE 2

| | Example 2 | Control 2 | Control 3 |
|---|---|---|---|
| Wall thickness (μm) | 140 | 140 | 150 |
| Bubble point (kg/cm²) | 1.2 | 1.2 | 1.1 |
| $C_{3a}$ in filtered blood plasma/$c_{3a}$ in blood plasma before filtration | 1.9 | 5.6 | 21.2 |
| Ratio of recovery of fibrinogen (%) | 93 | 54 | 91 |
| Ratio of recovery of fibrinogens F.VIII: C (%) | 90 | 73 | 92 |
| Ratio of recovery of total proteins (%) | 92 | 91 | 89.0 |

INDUSTRIAL APPLICABILITY

The porous hydrophilic polypropylene membrane of this invention, as described above, is a porous hydrophilic membrane possessing a fine reticular structure. This porous membrane has formed in at least either of the opposite surface parts thereof a surface layer of a reticular structure roughly equal to that in the inner part of membrane and has a water-soluble polymer chemically bonded to the surfaces of membrane and the surfaces of pores in the membrane. When this membrane is used as a blood plasma separation membrane, therefore, it has only a remote possibility of suffering blood cells to be embedded in the membrane or to be decayed by hemolysis. Further, since the water-soluble polymer bonded to the surfaces of pores in the member are in a state of generating rapid movement as though it were partially dissolved in blood plasma, it curbs the degeneration of blood plasma proteins by adsorption and represses the injury of separated blood plasma. As the result, the membrane recovers the coagulating factor in blood plasma in a high ratio and entails the activation of the complemental system only sparingly, indicating high compatibility of the membrane to blood. Thus, the membrane manifests an outstanding effect as a blood plasma separation membrane in the therapy of deceases due to immune abnormality and in the collection of when the membrane is used in the form of a module.

The method of production contemplated by this invention permits the porous membrane possessing such outstanding properties as described above to be produced easily.

We claim:

1. A porous hydrophilic polypropylene membrane possessing a fine reticular structure, wherein at least either of the opposite surfaces of the membrane forms a surface layer of a reticular structure substantially equal to that in the interior of the membrane; the membrane surfaces and the surfaces of pores in the membrane have a hydrophilic polymer chemically bonded thereto, said hydrophilic polymer being at least one member selected from the group of polymers consisting of the polymers represented by the following formula I:

wherein $R^1$ is H or $CH_3$ and $R^2$ is

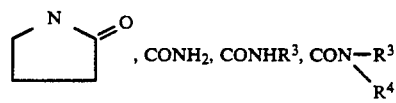

wherein $R^3$ and $R^4$ are each an alkyl of 1 to 4 carbon atoms,

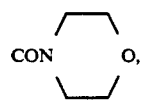

COOM, wherein m is a metallic atom, COOR⁵NHR⁶, wherein $R^5$ is an alkylene of 1 to 4 carbon atoms and $R^6$ is an alkyl of 1 to 4 carbon atoms,

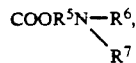

wherein $R^5$ and $R^6$ are as defined above and $R^7$ is an alkyl of 1 to 4 carbon atoms, or

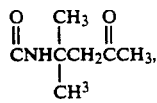

providing that $R^1$ is H where $R^2$ is

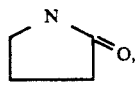

and n is an integer in the range of 10 to $10^4$; the membrane is composed substantially of a polypropylene possessing an average pore diameter in the range of 0.1 to 2.0 μm, a bubble point of not more than 2.0 kg/cm$^2$, a porosity in the range of 60 to 85%, and a water permeability of not less than 2 ml/min.mmHg.m$^2$; and the membrane is prepared using liquid polyether as a cooling and solidifying liquid.

2. A porous hydrophilic polypropylene membrane according to claim 1, wherein the ratio of shrinkage exhibited by the membrane after 20 minutes' heat treatment at 120° C. is not more than 5.0%.

3. A porous hydrophilic polypropylene membrane according to claim 1, wherein the ratio of swelling exhibited by the membrane when it is wetted is not more than 1.0%.

4. A porous hydrophilic polypropylene membrane according to claim 1, wherein said hydrophilic polymer is represented by the following formula II:

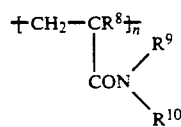

wherein n is as defined above, $R^8$ is H or $CH_3$ and $R^9$ and $R^{10}$ each are an alkyl group, providing that the total number of carbon atoms of $R^8$, $R^9$, and $R^{10}$ is not more than 8.

5. A porous hydrophilic polypropylene membrane according to claim 1 wherein the liquid polyether is polyethylene glycol.

6. A method for the production of porous hydrophilic polypropylene membrane, which comprises mixing 100 parts by weight of a polypropylene with 200 to 600 parts by weight of an organic filler uniformly dispersible in the polypropylene in a molten state and 0.1 and 5.0 parts by weight of a crystal seed-forming agent, discharging the resultant molten mixture into a form flat sheet to form molten membrane, cooling and solidifying the molten membrane with a liquid polyether, then extracting the organic filler from the solidified molten membrane, thermally setting the flat sheet, irradiating the resultant hydrophobic polypropylene membrane with a low-temperature plasma thereby forming a polymerization-initiating point on polypropylene molecules, reducing the pressure of the enveloping atmosphere of the reaction system to below 0.01 torr, and subsequently supplying a hydrophilic monomer to the reaction system thereby effecting chemical linkage of a hydrophilic polymer to the surfaces of the membrane and the surfaces of the pores in the membrane.

7. A method according to claim 6, wherein the contact of said molten membrane with said cooling and solidifying liquid is accomplished by disposing a guide roller in the cooling and solidifying liquid bath in such a manner that part of said guide roller remains above the surface of said cooling and solidifying liquid, and causing the molten membrane to be discharged onto said guide roller and then guided into said cooling and solidifying liquid by virtue of the rotation of said guide roller.

8. A method according to claim 6, wherein said polypropylene possesses a melt index in the range of 5 to 70.

9. A method according to claim 8, wherein said crystal seed-forming agent is incorporated in an amount in the range of 0.1 to 1.0 part by weight.

10. A method according to claim 6, wherein said polypropylene is a mixture of 100 parts by weight of a polypropylene possessing a melt index in the range of 5 to 40 with 0 to 150 parts by weight of a polypropylene possessing a melt index in the range of 0.05 to 5.

11. A method according to claim 6, wherein said crystal seed-forming agent is an organic heat-resistant substance possessing a melting point of not lower than 150° C. and a gelling point not lower than the crystallization initiating temperature of said polypropylene.

12. A method according to claim 6, wherein said hydrophilic monomer is at least one member selected from the group of compounds represented by the following formula III:

wherein $R^1$ is H or $CH_3$ and $R^2$ is

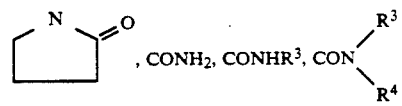

wherein $R^3$ and $R^4$ each stand for an alkyl of 1 to 4 carbon atoms,

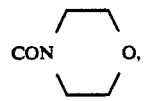

COOM, wherein M is a metallic atom, $COOR^5NHR^6$, wherein $R^5$ is an alkylene of 1 to 4 carbon atoms and $R^6$ is an alkyl or 1 to 4 carbon atoms,

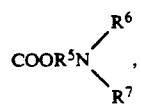

wherein $R^5$ and $R^6$ are as defined above and $R^7$ is an alkyl of 1 to 4 carbon atoms, or

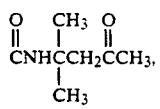

providing that $R^1$ is H where $R^2$ is

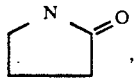

and n is an integer in the range of 10 to $10^4$.

13. A method according to claim 12, wherein said hydrophilic monomer is represented by the following formula IV:

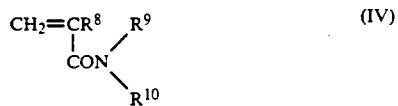

wherein n is as defined above $R^8$ is H or $CH_3$ and $R^9$ and $R^{10}$ each are an alkyl group, providing that the total number of carbon atoms of $R^8$, $R^9$, and $R^{10}$ is not more than 8.

14. A method according to claim 6 wherein the liquid polyether is polyethylene glycol.

* * * * *